(12) United States Patent
Shavell et al.

(10) Patent No.: US 9,729,620 B1
(45) Date of Patent: Aug. 8, 2017

(54) REDUCING REDUNDANT TRANSMISSIONS IN CLIENT POLLING OPERATIONS USING A BACKEND DATA GRID

(71) Applicant: Symantec Corporation, Mountain View, CA (US)

(72) Inventors: Michael Shavell, Merrimack, NH (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 234 days.

(21) Appl. No.: 14/571,257

(22) Filed: Dec. 15, 2014

Related U.S. Application Data (63) Continuation-in-part of application No. 14/103,610, filed on Dec. 11, 2013.

(51) Int. Cl.
*G06F 15/16* (2006.01)
*H04L 29/08* (2006.01)
*H04L 29/06* (2006.01)

(52) U.S. Cl.
CPC ............ *H04L 67/10* (2013.01); *H04L 67/42* (2013.01)

(58) Field of Classification Search
CPC . H04L 67/12; H04L 12/2803; H04L 12/2814; H04L 12/2823; H04L 67/10; H04L 69/26; H04L 2012/285; H04L 45/00; G06F 11/3495; G06F 9/54; G06F 8/65; G06F 5/10; G06F 15/16
See application file for complete search history.

(56) References Cited

U.S. PATENT DOCUMENTS

| | | | |
|---|---|---|---|
| 8,387,110 B1* | 2/2013 | Cooper | H04L 63/102 726/1 |
| 2003/0177044 A1* | 9/2003 | Sokel | G06Q 10/02 705/5 |
| 2004/0003093 A1* | 1/2004 | Kamath | G06F 9/54 709/227 |
| 2006/0285515 A1* | 12/2006 | Julian | H04W 72/12 370/328 |
| 2007/0100806 A1* | 5/2007 | Ramer | G06F 17/30749 |
| 2013/0339509 A1* | 12/2013 | Johnson | H04L 41/14 709/223 |

* cited by examiner

*Primary Examiner* — Arvin Eskandarnia
*Assistant Examiner* — Thao Duong
(74) *Attorney, Agent, or Firm* — Patent Law Works LLP (57) ABSTRACT

A server receives a data request from a client. The request contains contextual information which can be used at a server/datacenter level for providing the requested data. The server uses the contextual information to prepare a response to the request. The server stores the received contextual information in association with the specific client in a data grid, such that an identifier of the client can be used by any server in the datacenter to access the stored information. Subsequent to the storing of the contextual information in the data grid, a second request from the same client is received by any server with access to the data grid. The second request contains the client identifier, but not the contextual information. The server uses the identifier to access the stored contextual information in the data grid, and uses the contextual information to prepare a response to the second request.

19 Claims, 4 Drawing Sheets

REDUCING REDUNDANT TRANSMISSIONS IN CLIENT POLLING OPERATIONS USING A BACKEND DATA GRID

CROSS REFERENCE TO RELATED APPLICATIONS

This application claims priority as a continuation-in-part to utility application Ser. No. 14/103,610 entitled "Reducing Redundant Transmissions by Polling Clients" ("The Reducing Redundant Transmissions Using Connection Context Application"). The Reducing Redundant Transmissions Using Connection Context Application was filed on Dec. 11, 2013, and has the same inventors and assignee as this application. The content of the Reducing Redundant Transmissions Using Connection Context Application is incorporated herein by reference in its entirety.

TECHNICAL FIELD

This disclosure pertains generally to datacenter management, and more specifically to reducing the amount of redundant information being transmitted between polling clients and the servers of a datacenter, using a backend data grid.

BACKGROUND

A contemporary cloud based datacenter can make applications, services and data available to very large numbers of client computers simultaneously. For example, a given node in the datacenter can have millions of concurrent network connections. Clusters are groups of computers that can be deployed in these and other contexts to provide high availability. Clusters use groups of redundant computing resources in order to provide continued service when individual system components fail. Clusters eliminate single points of failure by providing multiple servers, multiple network connections, redundant data storage, etc. Clustering systems are often combined with storage management products that provide additional useful features, such as journaling file systems, logical volume management, etc.

A client may periodically poll one or more servers in a datacenter to request software updates, configuration settings, log events, policy updates, and/or various other types of data. A request body may comprise data to be utilized by the server for producing the response, for example, the client hardware and/or software configuration needed for selecting the required software updates, or other client registration or context information used by the server to configure a response to a client polling request.

As contemporary web applications can serve hundreds of millions of clients, the amount of network traffic between the clients and the servers can be considerable.

SUMMARY

The amount of redundant information transmitted by client computers to servers is reduced by backend storage of contextual information. A server in a datacenter receives a first request from a client to provide data. The received first request contains contextual information which can be used at a server/datacenter level for providing the requested data to the client. The server uses the received contextual information to prepare a response to the first request, and transmits the prepared response to the client. The server also stores the received contextual information in association with the specific client in a datacenter level data grid, such that an identifier of the specific client can be used by any server in the datacenter to access the stored contextual information. Subsequent to the storing of the received contextual information in the data grid, a second request from the same client is received to provide data. The second request can be received and processed by the same server as the first request, or by any other server with access to the data grid. The received second request contains the identifier of the specific client, but does not contain the contextual information. Because the client identifier is smaller than the contextual information, the second request is more efficient to transmit and process. The receiving server uses the identifier of the client from the second request to access the stored contextual information in the data grid. The server then uses the retrieved contextual information to prepare a response to the second request, and transmits the response to the second request to the client.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
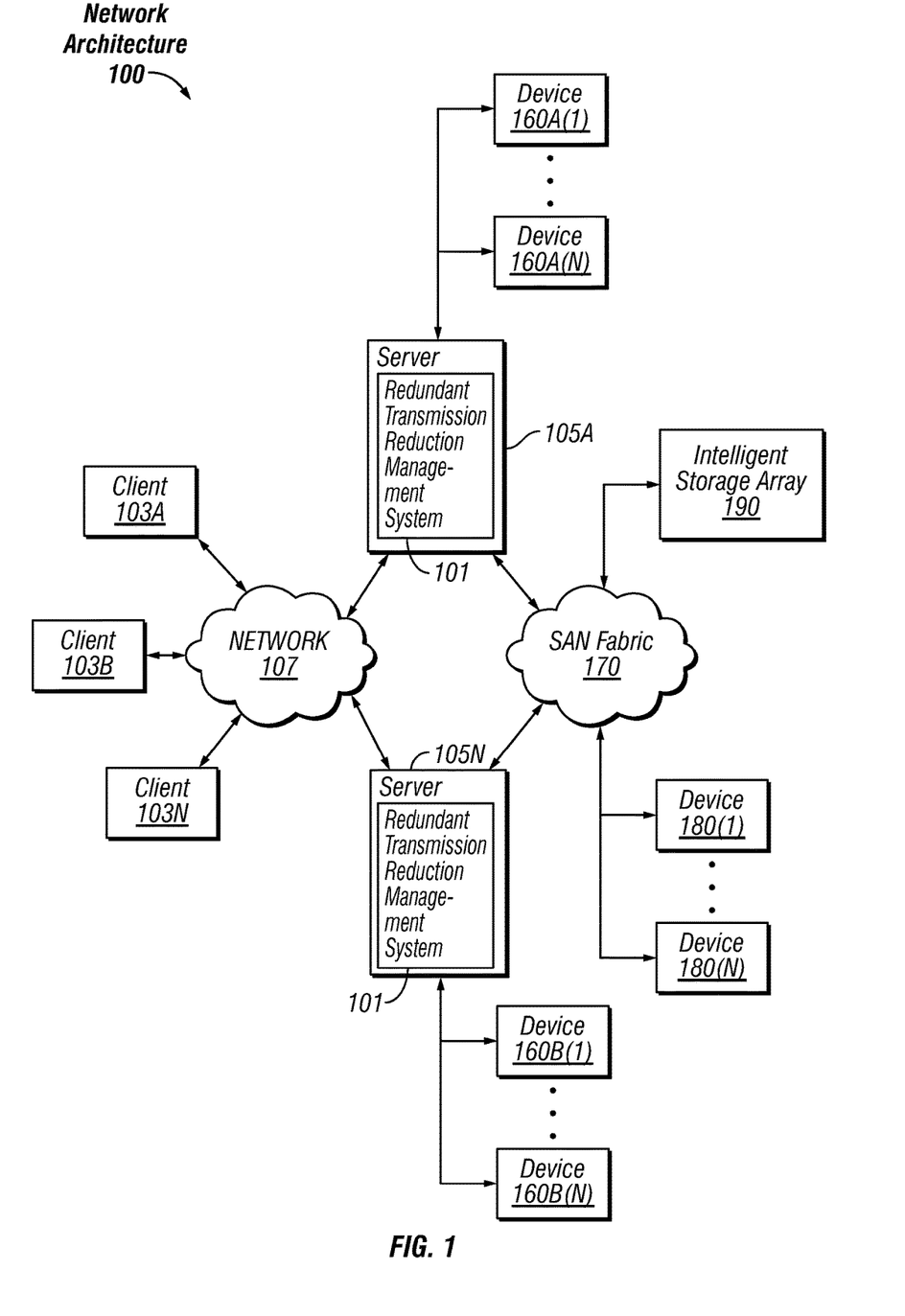
FIG. 1 is a block diagram of an exemplary network architecture in which a redundant transmission reduction management system can be implemented, according to some embodiments.

FIG. 1 is a block diagram illustrating an exemplary network architecture 100 in which a redundant transmission reduction management system 101 can be implemented. In the illustrated network architecture 100, client systems 103A, 103B and 103N, as well as servers 105A and 105N, are communicatively coupled to a network 107. It is to be understood that in practice orders of magnitude more clients 103 and servers 105 can be deployed. A redundant transmission reduction management system 101 is illustrated as residing on each server (105A and 105N), but it is to be understood that in different embodiments the redundant transmission reduction management system 101 can reside on different computers 210, or be distributed between multiple computing systems 210 in different ways as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. Clients 103 can be in the form of, for example, desktop computers, laptop computers, or handheld or wearable mobile computing devices, comprising portable computer systems capable of connecting to a network 107 and running applications.

Although FIG. 1 illustrates three clients 103A-N and two servers 105A-N as an example, in practice many more (or fewer) computers can be deployed as noted above. In one embodiment, the network 107 is in the form of the internet. Other networks 107 or network-based environments can be used in other embodiments.

Figure 2:
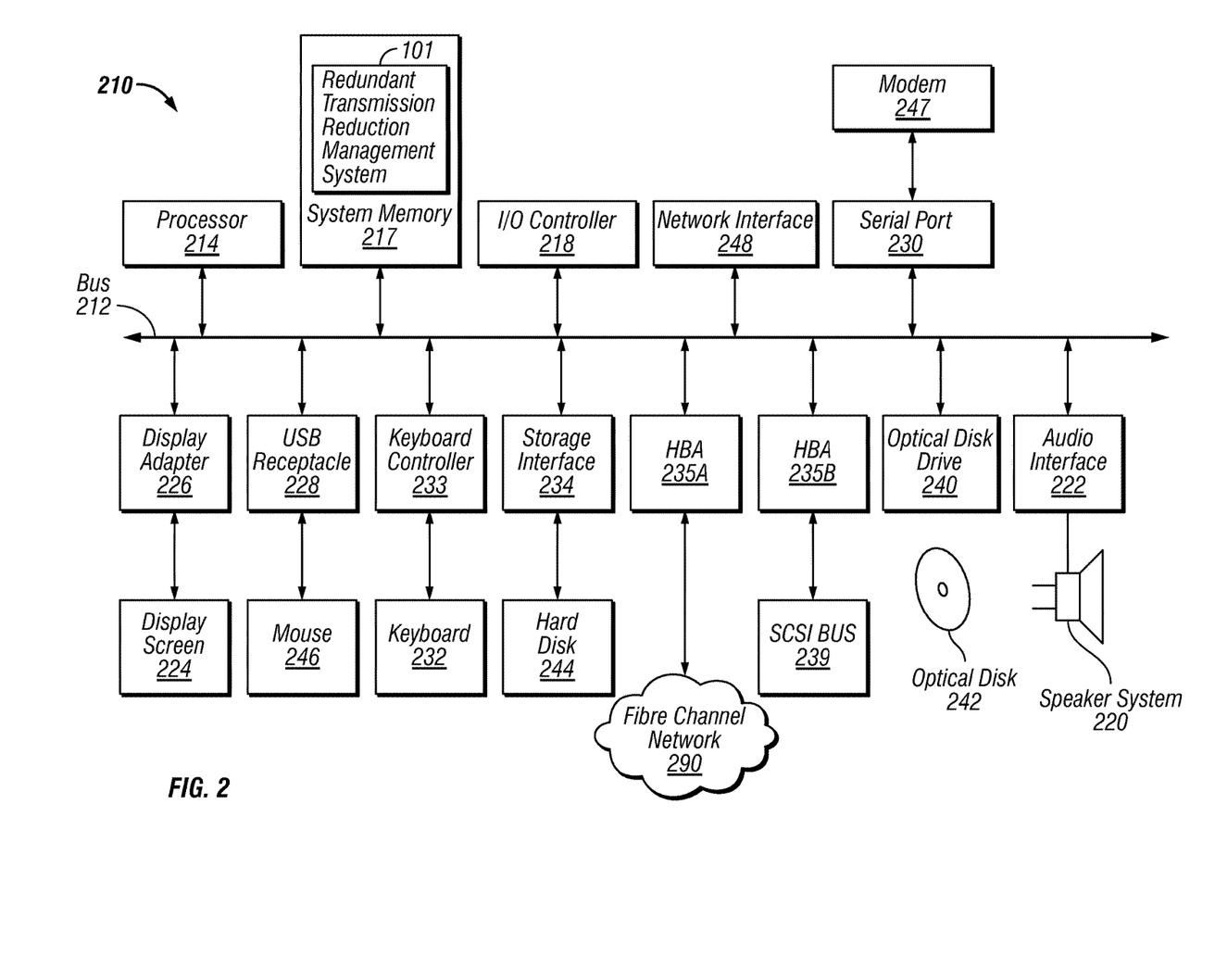
FIG. 2 is a block diagram of a computer system suitable for implementing a redundant transmission reduction management system, according to some embodiments.

FIG. 2 is a block diagram of a computer system 210 suitable for implementing a redundant transmission reduction management system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the redundant transmission reduction management system 101 is illustrated as residing in system memory 217. The workings of the redundant transmission reduction management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
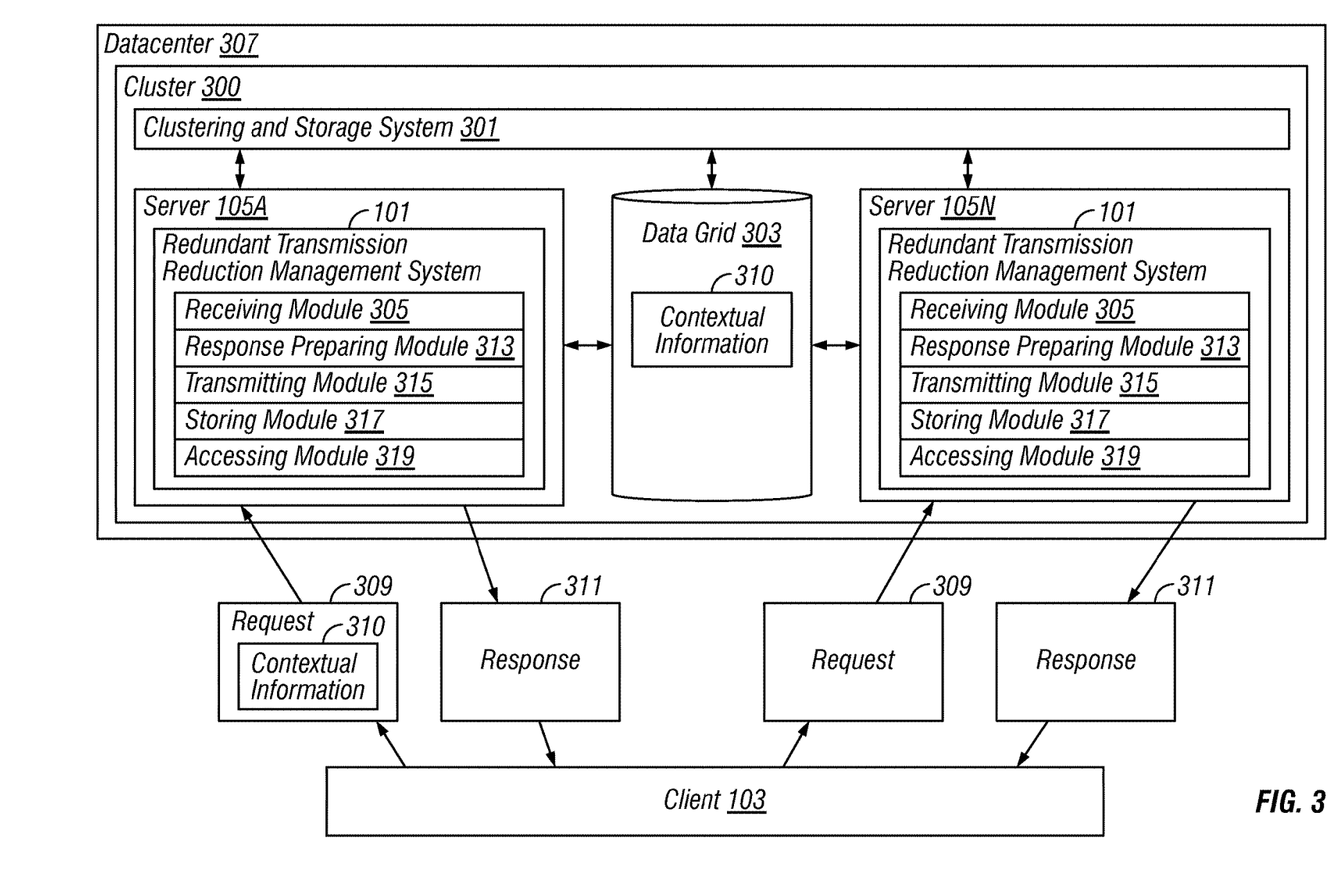
FIG. 3 is a high level block diagram of the operation of a redundant transmission reduction management system, according to some embodiments.

FIG. 3 illustrates a redundant transmission reduction management system 101 running on each of two servers 105 in a datacenter 307. As described above, the functionalities of the redundant transmission reduction management system 101 can reside on specific computers 210 or be otherwise distributed between multiple computer systems 210, including within a fabric/cloud-based computing environment in which the functionality of the redundant transmission reduction management system 101 is provided as a service over a network 107. It is to be understood that although the redundant transmission reduction management system 101 is illustrated in FIG. 3 as a single entity, the illustrated redundant transmission reduction management system 101 represents a collection of functionalities, which can be instantiated as a single or multiple modules as desired (instantiation of a specific, multiple module redundant transmission reduction management system 101 is illustrated in FIG. 3). It is to be understood that the modules of the redundant transmission reduction management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the redundant transmission reduction management system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

FIG. 3 illustrates a cluster 300 instantiated in the context of a clustering and storage system 301. In this context, the two illustrated server 105A and 105N can be thought of as nodes in the cluster 300. For efficiency of illustration and explanation, the clustering and storage system 301 is illustrated as a centralized component residing outside of any node. It is to be understood that the clustering and storage system 301 represents a collection of functionalities, which in practice are typically instantiated as a plurality of components that are distributed throughout the cluster. The cluster 300 illustrated in FIG. 3 is maintained in the context of a datacenter 307, but in other embodiments the redundant transmission reduction management system 101 can be implemented in network 107 contexts other than clusters 300 and/or datacenters 307. In FIG. 3, the illustrated cluster 300 depicts two servers 105 and one data grid 303. It is to be understood that in other embodiments, a datacenter 307 can comprise a cluster made up of many more nodes, including orders of magnitude more. FIG. 3 also illustrates only a single client 103 communicating with the servers 105 of the datacenter 307, but it is to be understood that in practice millions of clients 103 can do so.

As noted in the Reducing Redundant Transmissions Using Connection Context Application, "client" and "server" designations herein are relative, rather than absolute: the same computer system (or process executed by such computer system) may simultaneously act as a server towards one computer system (or process executed by such computer system) and as a client towards another computer system (or process executed by such computer system). For example, an HTTP server may act as a "server" with respect to a browser executed by a client device, and may at the same time act as an HTTP client transmitting HTTP requests to an application server; the latter may in turn act as a database client with respect to a database server.

"Network layer," "transport layer," "session layer," "presentation layer," and "application layer" herein refers to the respective layers defined by the Open Systems Interconnection (OSI) model (ISO/IEC 7498-1).

In the embodiment illustrated in FIG. 3, a redundant transmission reduction management system 101 runs on each of multiple server computer 105 in a datacenter 307, and reduces redundant information that would conventionally be transmitted between client computers 103 and the server computers 105. As illustrated, a receiving module 305 of the redundant transmission reduction management system 101 on a given server (e.g., server 105A) in the datacenter 307 receives an initial request 309 from a client 103 to provide data. The initial request 309 from the client contains contextual information 310 for datacenter level processing to provide the requested data to the requesting client 103.

For example, as explained in the Reducing Redundant Transmissions Using Connection Context Application, in some embodiments a client 103 may periodically transmit polling requests 307 to a server 105 over a chosen transport-layer protocol. In various embodiments, this can consist of the client 103 periodically polling the server 105 to request software updates, configuration settings, log events, policy updates or other arbitrary data. The requests 307 may comprise one or more application protocol headers and a payload. The latter may be represented by application-specific arbitrary binary data. A request 309 may comprise data to be utilized by the server 105 for producing a response 311, for example the client hardware and/or software configuration used for selecting the appropriate software updates. As discussed in the Reducing Redundant Transmissions Using Connection Context Application, a request 309 may comprise one or more binary large objects (blobs). In an illustrative example, a polling request 309 may comprise a system configuration of the client 103 (including, e.g., hardware configuration and/or software configuration) and a server 105 response 311 may comprise one or more software updates for the client 103.

As explained in more detail below, responsive to receiving a request 309, the server 105 may transmit a response 311 back to the requesting client 103, wherein the response 311 contains requested information in the form of application-specific arbitrary binary data. A response preparing module 313 of the redundant transmission reduction management system 101 on the server 105 can use the received contextual information 310 to prepare a response 311 to the request 309. A transmitting module 315 of the redundant transmission reduction management system 101 then transmits the prepared response 311 to the specific client 103.

In various embodiments, one or more standard or proprietary protocols supporting a request-response paradigm, including hypertext transfer protocol ("HTTP"), may be employed by client 105 and server 105 for communicating to each other. In an illustrative example, the client 105 may execute an HTTP client process which may be represented by a web browser or other standard or custom HTTP client. The server 105 may execute an HTTP server process which may be represented by a standard or custom HTTP server. Client 105 may encode polling requests 307 as HTTP protocol requests 307 (e.g., PUT, GET, etc.), thus expecting HTTP responses 311 from the server 105. If a blob is to be transmitted to the server 105, the client 103 may utilize an HTTP PUT request 309 including the blob in the request 309 body. One or more standard and/or custom HTTP headers may be used by the client 103 to convey request-specific information to the server 105.

Because a single server 105 may be utilized to serve requests 307 by multiple clients 103 (including very large numbers of clients 103, e.g., hundreds of thousands/millions), the capacity of the server 105 (e.g., the network channel capacity and/or computational capacity) may become a limiting factor. Hence, reducing the load upon the server 105 can be highly beneficial. The processing load upon the server 105 may be reduced by eliminating at least some redundancy in the payloads being transmitted by clients 103 to the server 105.

An optimized payload transfer mode is described herein, according to which a client 103 can send a payload once with an initial request 307 to any server 105 in the datacenter 307, and then avoid repeatedly sending the payload in subsequent requests 307 to any server 105 in the datacenter 307, so long as the payload does not need to be modified. In one embodiment, the client 103 informs the server 105 that it is employing an optimized payload transfer mode with an initial request 309, e.g., by including a pre-defined header in the initial request 309. After having been notified that the optimized payload transfer mode is being employed by the client 103, a storing module 317 of the redundant transmission reduction management system 101 on the first server 105 stores the portion of the payload which remains the same between client requests 309 in the data grid 303, as described in detail below. In one embodiment, this portion of the payload is in the form of the contextual information 310 which can be used at a server/datacenter level to provide the requested data back to the requesting client 103.

As illustrated in FIG. 3, the storing module 317 of the redundant transmission reduction management system 101 on the server 105 stores the received contextual information 310 in the data grid 303. The storing module 317 stores the contextual information 310 in association with the specific client 103 from which it was received, such that an identifier of the specific client 103 (e.g., a device id or the like) can be used by any one of the plurality of servers 105 in the datacenter 307 to access the stored contextual information 310. The data grid 303 can be implemented in the form of any distributed memory or persistent storage architecture. In one embodiment, the data grid is implemented using Oracle Coherence®. The client identifier can be in any format that can be used to identify a specific requesting client 103. In one embodiment, the redundant transmission reduction management system 101 generates the identifier of the specific client 103, and transmits the generated identifier to the client 103 as part of the response 311 to the initial request 309. In other embodiments, the client 103 provides the identifier (e.g., a device id or the like) by including it in an initial request 309.

In one embodiment, the storing module 317 is instantiated at a "sub-application" layer (e.g., represented by the transport, session, presentation, or lower application layer) of the server 105. The stored contextual information 310 may subsequently be retrieved and appended to subsequent requests 309 when forwarding those to the response preparing module 313, which can be instantiated at the application layer of the server 105, as described in more detail herein below.

As noted in the Reducing Redundant Transmissions Using Connection Context Application, the client 103 may establish a TCP connection with a server 105 and transmit an initial polling request 309. The initial polling request may comprise an identifier of the method to be applied to a resource (e.g., PUT), an identifier of the resource represented by a Uniform Resource Identifier (URI), one or more request headers, and the message body represented by arbitrary textual or binary data. In one example, the initial polling request 309 can be represented by a PUT request comprising a URI, a request body comprising one or more blobs and a header indicating that the client intends to employ the optimized payload transfer mode in subsequent polling requests 309.

Responsive to receiving initial polling request 309, the redundant transmission reduction management system 101 on the server 105 may parse to request 309 to determine the request method, extract the request headers and/or the request body. Responsive to determining that the optimized payload transfer mode has been requested by the client 103, the storing module 317 can store the contextual information 310, which can be in the form of one or more blobs extracted from the body of the request 309. The request body can then be forwarded to the response preparing module 313 (at the application layer) for processing.

The response preparing module 313 can analyze the contextual information 310 from the body of the request 309, and construct a response 311 to be transmitted back to the client. In an illustrative example, a polling request 309 may comprise the client system configuration (including, e.g., hardware configuration and/or software configuration) and the prepared response 311 may comprise the software updates to be installed by the client 103. In other examples, the client may send polling requests 309 for updated configuration settings, logged events, policy updates or other arbitrary data.

Responsive to processing the request 309, the transmitting module 315 can transmit a response 311 back to client 103. The response 311 may comprise a response status code, one or more response headers, and a response body. The latter may comprise the data requested by the client 103 (e.g., software updates, configuration settings, log events, policy updates or other arbitrary data). In certain implementations, the response 311 may further comprise an acknowledgement of the directive to utilize the optimized payload transfer mode. In an illustrative example, the acknowledgement may be represented by a custom status code or by a response header.

Upon receiving the optimized payload transfer mode acknowledgement, the client 103 may switch to the optimized payload transfer mode. In the optimized payload transfer mode, the client 103 may transmit subsequent requests 309 in an abbreviated form. In other words, when in optimized payload transfer mode, the client 103 can send requests 309 without appending one or more blobs that have already been transmitted within the body of initial request 309 and do not need to be updated (e.g., contextual information 310 transmitted in the initial request 309 that has not changed). In certain implementations, an abbreviated request 311 is in the form of a GET request. An abbreviated request 311 contains the above-described identifier of the specific client 103, but does not contain the contextual information 310 (or other data) that has already been transmitted with the initial request. Because the client identifier is smaller (consists of fewer bytes) than the contextual information 310, an abbreviated request 309 is smaller than an initial one.

After having stored the received contextual information 310 in the data grid 303, the receiving module 305 can receive an additional request from the same specific client 103 to provide data. This subsequent request can be in abbreviated form, and as such contain the identifier of the client 103, but not the contextual information 310 for datacenter level processing for the provision of the requested data back to the client 103. This receipt of the subsequent request can comprise receiving a second application layer request 309 from the specific client 103 over the transport layer connection.

Using the identifier of the client 103 from the abbreviated request 309, an information accessing module 319 accesses the stored contextual information 310 in the data grid 303. The response preparing module 313 then uses the retrieved contextual information 310 to prepare a response 311 to the abbreviated request 309. The transmitting module 315 then transmits the prepared response 311 to the client 103. As explained above, in some embodiments the response preparing module 313 is implemented at the application layer, in which case the retrieved contextual information 310 is provided thereto. More specifically, the stored context information 310 which was received in the payload of the initial request 309 is passed to the response preparing module 313 at the application layer, as if the contextual information has been received as part of abbreviated request 309.

The client 103 may transmit multiple abbreviated requests 309 following initial request 309. In response to each abbreviated request, the information accessing module 319 can retrieve the contextual information from the data grid 303, and append it to the abbreviated request 309 when forwarding that to the response preparing module 313 at the application layer, so that the latter would not be able to distinguish an abbreviated request 309 from an initial one that contained the contextual information 310. Note that abbreviated requests 309 need not be transmitted on the same connection as the initial request 309. Because the contextual information is stored in the data grid 303 in association with a client identifier which is included in the abbreviated request 309, the redundant transmission reduction management system 101 can obtain the contextual information from the data grid 303 regardless of the connection on which the abbreviated request 309 was received.

It is also the case that an abbreviated request 309 from a client 103 need not be processed by the same server 105 as the initial request 309. For example, in a scenario where the initial request 309 is received and processed by the redundant transmission reduction management system 101 on a first server (e.g., server 105A), the receiving module 305 of the redundant transmission reduction management system 101 on a second server (e.g., server 105N) in the datacenter 307 can receive a subsequent request 309 from the same client 103. The information accessing module 319 of the redundant transmission reduction management system 101 on the second server 105N uses the client identifier in the abbreviated request 309 to access the contextual information 310 that the storing module 317 of the redundant transmission reduction management system 101 on the first server 105A previously stored in the data grid 303. Because the data grid operates at a datacenter level, any of the servers 105 (nodes) in the datacenter 307 can access it. The response preparing module 313 of the redundant transmission reduction management system 101 on the second server 105N then uses the retrieved contextual information 310 to prepare a response 311 to the abbreviated request 309, and the corresponding transmitting module 315 transmits the response 311 to the client 103.

Figure 4:
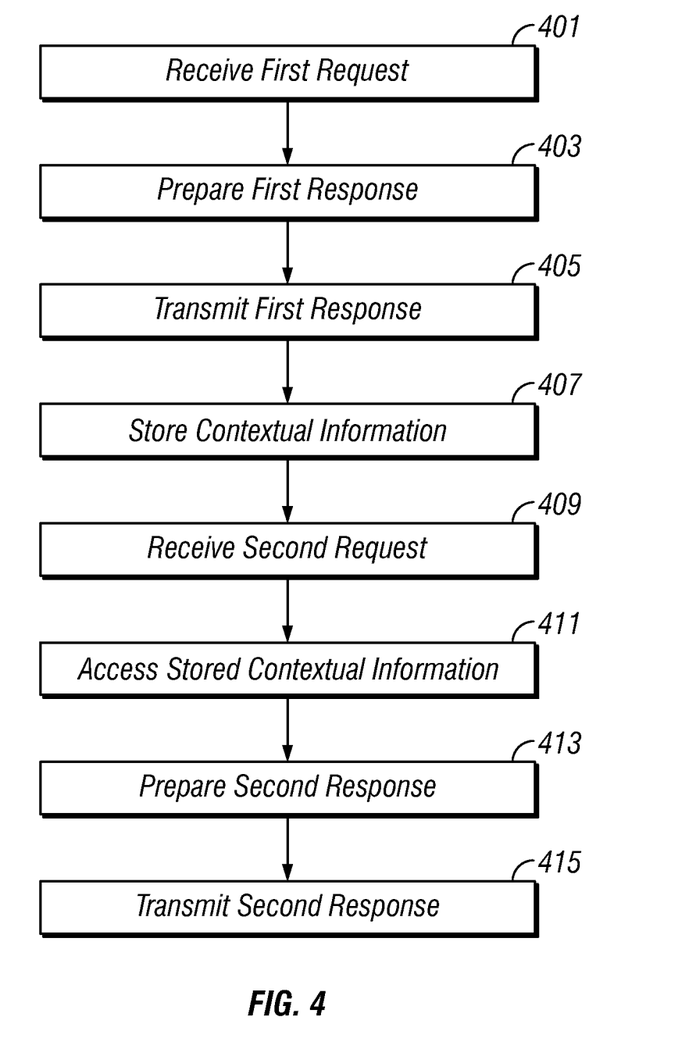
FIG. 4 is a flow chart of the steps an exemplary method of the operation of a connection redundant transmission reduction management, according to some embodiments.

FIG. 4 illustrates steps of the operation of a redundant transmission reduction management system 101, according to some embodiments. The receiving module 305 receives 401 a first request 309 from a specific client 103 to provide data, the received first request 309 containing contextual information 310 for datacenter level processing for the provision of the requested data to the specific client 103. The response preparing module 313 uses 403 the received contextual information 310 to prepare a response 311 to the first request 309. The transmitting module 315 transmits 405 the prepared response 311 to the specific client 103. The storing module 317 stores 407 the received contextual information 310 in association with the specific client 103 in the data grid 303, such that an identifier of the specific client can be used by any one of the plurality of servers 105 in the datacenter 307 to access the stored contextual information 310. Subsequent to the storage of the received contextual information 310, the receiving module 305 receives 409 a second request 309 from the specific client 103 to provide data (the second request contains the identifier of the specific client, but does not contain the contextual information 310). The information accessing module 319 uses 411 the identifier of the specific client to access the stored contextual information 310 in the data grid 303. The response preparing module 313 uses 413 the retrieved contextual information 310 to prepare a response 311 to the second request 309, and the transmitting module 315 transmits 415 the response 311 to the second request 309 to the specific client 103.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for reducing redundant information transmitted between a plurality of client computers and a datacenter comprising multiple server computers and a data grid, the method comprising the steps of:
    a first server in the datacenter receiving a first polling request from a specific client to provide data, the received first polling request containing contextual information for datacenter level processing for provision of requested data to the specific client, wherein the contextual information comprises at least one binary large object (blob) extracted from the body of a first polling request;
    the first server using the received contextual information to prepare a response to the first polling request and transmit the prepared response to the specific client;
    the first server storing the received contextual information in association with the specific client in the data grid, such that an identifier of the specific client can be used by any one of the plurality of servers in the datacenter to access the stored contextual information;
    subsequently to storing the received contextual information in association with the specific client in the data grid, the first server receiving a second polling request from the specific client to provide data, the received second polling request containing the identifier of the specific client, but not containing the contextual information for datacenter level processing for provision of requested data to the specific client, wherein the identifier of the specific client consists of fewer bytes than does the contextual information;
    the first server using the identifier of the specific client to access the stored contextual information in the data grid; and
    the first server using the retrieved contextual information to prepare a response to the second polling request and transmit the prepared response to the second polling request to the specific client.

2. The method of claim 1 further comprising:
    a second server in the datacenter receiving a third polling request from the specific client to provide data, the third polling request being received by the second server subsequently to the first server storing the received contextual information in association with the specific client in the data grid;
    wherein the received third polling request contains the identifier of the specific client, but does not contain the contextual information for datacenter level processing for provision of requested data to the specific client, and wherein the identifier of the specific client consists of fewer bytes than does the contextual information;
    the second server using the identifier of the specific client to access the stored contextual information in the data grid; and the second server using the retrieved contextual information to prepare a response to the third polling request and transmit the prepared response to the third polling request to the specific client.

3. The method of claim 1 wherein:
the first server generates the identifier of the specific client, and transmits the generated identifier to the specific client as part of the response to the first polling request.

4. The method of claim 1 wherein:
the first polling request received by the first server from the specific client contains the identifier of the specific client.

5. The method of claim 1 wherein:
the first server receiving the first polling request from the specific client further comprises the first server receiving a first application layer request from the specific client over a transport layer connection, the first application layer request containing the contextual information;
the first server using the received contextual information to prepare a response to the first polling request further comprises the application layer using the received contextual information to prepare the response to the first polling request;
the first server receiving the second polling request from the specific client further comprises the first server receiving a second application layer request from the specific client over the transport layer connection, the second application layer request not containing the contextual information; and
the first server using the retrieved contextual information to prepare a response to the second polling request further comprises the first server providing the retrieved contextual information to the application layer, and the application layer using the received contextual information to prepare the response to the second polling request.

6. The method of claim 5 wherein:
the transport layer connection is provided by a transport control protocol ("TCP") connection.

7. The method of claim 1 wherein:
the first polling request and the second polling request further comprise hypertext transport protocol ("HTTP") requests.

8. The method of claim 7 wherein:
the first hypertext transport protocol ("HTTP") request further comprises a POST request; and
the second hypertext transport protocol ("HTTP") request further comprises a GET request.

9. The method of claim 1 wherein:
at least one of the first polling request and the second polling request contains an indication of an optimized payload transfer mode.

10. At least one non-transitory computer readable medium for reducing redundant information transmitted between a plurality of client computers and a datacenter comprising multiple server computers and a data grid, the at least one non-transitory computer readable medium storing computer executable instructions that, when loaded into computer memory and executed by at least one processor of at least one computing device, cause the at least one computing device to perform the following steps:
a first server in the datacenter receiving a first polling request from a specific client to provide data, the received first polling request containing contextual information for datacenter level processing for provision of requested data to the specific client, wherein the contextual information comprises at least one binary large object (blob) extracted from a body of the first polling request;
the first server using the received contextual information to prepare a response to the first polling request and transmit the prepared response to the specific client;
the first server storing the received contextual information in association with the specific client in the data grid, such that an identifier of the specific client can be used by any one of the plurality of servers in the datacenter to access the stored contextual information;
subsequently to storing the received contextual information in association with the specific client in the data grid, the first server receiving a second polling request from the specific client to provide data, the received second polling request containing the identifier of the specific client, but not containing the contextual information for datacenter level processing for provision of requested data to the specific client, wherein the identifier of the specific client consists of fewer bytes than does the contextual information;
the first server using the identifier of the specific client to access the stored contextual information in the data grid; and
the first server using the retrieved contextual information to prepare a response to the second polling request and transmit the prepared response to the second polling request to the specific client.

11. The at least one non-transitory computer readable medium of claim 10 further storing computer executable instructions that, when loaded into computer memory and executed by at least one processor of at least one computing device, cause the at least one computing device to perform the following additional steps:
a second server in the datacenter receiving a third polling request from the specific client to provide data, the third polling request being received by the second server subsequently to the first server storing the received contextual information in association with the specific client in the data grid;
wherein the received third polling request contains the identifier of the specific client, but does not contain the contextual information for datacenter level processing for provision of requested data to the specific client, and wherein the identifier of the specific client consists of fewer bytes than does the contextual information;
the second server using the identifier of the specific client to access the stored contextual information in the data grid; and
the second server using the retrieved contextual information to prepare a response to the third polling request and transmit the prepared response to the third polling request to the specific client.

12. The at least one non-transitory computer readable medium of claim 10 wherein:
the first server generates the identifier of the specific client, and transmits the generated identifier to the specific client as part of the response to the first polling request.

13. The at least one non-transitory computer readable medium of claim 10 wherein:
the first polling request received by the first server from the specific client contains the identifier of the specific client.

14. The at least one non-transitory computer readable medium of claim 10 wherein:

the first server receiving the first polling request from the specific client further comprises the first server receiving a first application layer request from the specific client over a transport layer connection, the first application layer request containing the contextual information;

the first server using the received contextual information to prepare a response to the first polling request further comprises the application layer using the received contextual information to prepare the response to the first polling request;

the first server receiving the second polling request from the specific client further comprises the first server receiving a second application layer request from the specific client over the transport layer connection, the second application layer request not containing the contextual information; and the first server using the retrieved contextual information to prepare a response to the second polling request further comprises the first server providing the retrieved contextual information to the application layer, and the application layer using the received contextual information to prepare the response to the second polling request.

15. The at least one non-transitory computer readable medium of claim 14 wherein:

the transport layer connection is provided by a transport control protocol ("TCP") connection.

16. The at least one non-transitory computer readable medium of claim 10 wherein:

the first polling request and the second polling request further comprise hypertext transport protocol ("HTTP") requests.

17. The at least one non-transitory computer readable medium of claim 16 wherein:

the first hypertext transport protocol ("HTTP") request further comprises a POST request; and the second hypertext transport protocol ("HTTP") request further comprises a GET request.

18. The at least one non-transitory computer readable medium of claim 10 wherein:

at least one of the first polling request and the second polling request contains an indication of an optimized payload transfer mode.

19. A computer system for reducing redundant information transmitted between a plurality of client computers and a datacenter comprising multiple server computers and a data grid, the computer system comprising:

a processor;

system memory;

a receiving module residing in the system memory, the receiving module being programmed to receive a first polling request from a specific client to provide data, the received first polling request containing contextual information for datacenter level processing for provision of requested data to the specific client, wherein the contextual information comprises at least one binary large object (blob) extracted from a body of the first polling request, the receiving module being further programmed to receive a second polling request from the specific client to provide data, subsequently to storing the received contextual information in association with the specific client in the data grid, the received second polling request containing the identifier of the specific client, but not containing the contextual information for datacenter level processing for provision of requested data to the specific client, wherein the identifier of the specific client consists of fewer bytes than does the contextual information;

a storing module residing in the system memory, the storing module being programmed to store the received contextual information in association with the specific client in the data grid, such that an identifier of the specific client can be used by any one of the plurality of servers in the datacenter to access the stored contextual information;

an information accessing module residing in the system memory, the information accessing module being programmed to use the identifier of the specific client to access the stored contextual information in the data grid;

a response preparing module residing in the system memory, the response preparing module being programmed to use the contextual information to prepare a first response to the first polling request and a second response to the second polling request; and a transmitting module residing in the system memory, the transmitting module being programmed to transmit the first response and the second response to the requesting client.

* * * * *